Nov. 11, 1969   C. R. SCHWALLIE ET AL   3,477,284
TECHNIQUE FOR DEFORMATION ANALYSIS
Filed June 12, 1968   3 Sheets-Sheet 1

INVENTORS:
EARL I. RIEGNER,
CLETUS R. SCHWALLIE
BY *Alberts Hilburger*
ATTORNEY

Nov. 11, 1969     C. R. SCHWALLIE ET AL     3,477,284
TECHNIQUE FOR DEFORMATION ANALYSIS

Filed June 12, 1968

INVENTORS:
EARL I. RIEGNER,
CLETUS R. SCHWALLIE,
BY
ATTORNEY

United States Patent Office 3,477,284
Patented Nov. 11, 1969

3,477,284
TECHNIQUE FOR DEFORMATION ANALYSIS
Cletus R. Schwallie, Claymont, Del., and Earl I. Riegner, Springfield, Pa., assignors to The Boeing Company, Seattle, Wash., a corporation of Delaware
Filed June 12, 1968, Ser. No. 736,433
Int. Cl. G01n *3/00;* G01b *11/18*
U.S. Cl. 73—88                                       13 Claims

ABSTRACT OF THE DISCLOSURE

A method and apparatus for analyzing deformation in a test specimen. When an image of a master grid is superposed on a congruent working grid of a test specimen or, conversely, the working grid is superposed on the master grid, and the specimen is deformed, successive fringes appear which are essentially parallel to the grid lines. A barrier in the form of a polarizing filter is positioned between the master grid and the specimen so as to obscure part of the image such that a resulting display of fringes appears as distinguishable and apparently dissimilar colors.

---

This invention relates generally to a method and apparatus for analyzing deformation in a test specimen and specifically to an improved method and apparatus employing the moiré effect.

A variety of devices have been employed in the past to determine distributions of deformation or strain in a test specimen. These devices have included, for example, electrical resistance type strain gauges which are limited in their usefulness in that while they provide an indication of strain at particular locations, they are unable to conveniently provide a comprehensive indication of strain, that is, the "strain field," in the specimen.

One method which has been successful in displaying the strain field in a test specimen employs an optical phenomenon known as the moiré effect. The moiré effect is observed when one regular array of symbols, such as lines, is superposed on a second similar array. For normal test procedures, these arrays are often orthogonal straight lines initially of uniform pitch. One array, referred to as a master grid, is rigidly mounted on a transparent or translucent plate and is not subject to a change of pitch. The second array, referred to as a working grid, is mounted on the test specimen and is subject to a change of pitch as a function of the "displacement field," that is, the sum of movements of all points, in the test specimen. The displacement field in the test specimen may be caused, for example, by strain in the plane of the working grid.

In the absence of strain in the test specimen, the two superposed sets of grids are substantially matched and no fringes appear. However, when strain is introduced to the test specimen, the working grid is moved in proportion to the magnitude of the strain such that the lines of one grid become positioned to varying degrees between the lines of the other grid and thus introduce a pattern of alternating dark and light fringes. A dark fringe appears where a line of the working grid is displaced in a direction perpendicular to corresponding lines of the master grid by a distance equal to half the spacing of the master grid. In contrast, a light fringe, which in reality is the gap between dark fringes, appears where a line of the working grid is displaced by an integral multiple of the spacing of the master grid.

Beginning at an arbitrary "zero" fringe, successive fringes can be plotted against their location on the test specimen. Because a new fringe is generated only when the displacement field is equal to the initial pitch, or distance between two successive grid lines, it is possible to obtain a graph indicating displacement at any given location on the test specimen due to deformation versus the distance measured along a length of the test specimen. Thereupon, mathematical differentiation of a resulting displacement curve yields the strain field within the test specimen in the measured direction.

A primary drawback encountered when using conventional moiré techniques has been the inability to easily and accurately distinguish between X- and Y-fringes when viewed simultaneously. A situation in which it would be desirable to view simultaneously X- and Y-fringes arises, for example, when a test specimen is subjected to a strain which necessarily results in its destruction. In such an instance, it is difficult to successively view the individual X- and Y-fringes as the specimen is being destroyed and particularly at the very moment of its destruction. However, by reason of the present invention, it is possible to display the X- and Y-fringes simultaneously in distinguishable and apparently dissimilar colors.

To this end, it has been found that when a barrier in the form of a polarizing filter is accurately positioned and oriented between the master grid and the working grid on the specimen, part of the image of one grid superposed on the other grid is obscured such that a resulting display of fringes appears as distinguishable colors on a plane of the specimen. Specifically, one set of fringes is predominantly red and the other set of fringes is predominantly blue, thereby permitting rapid and accurate measurement between adjacent fringes of one set while yet being able to view fringes of the other set. Further, by rotating the filter in a plane substantially parallel with both the master grid and the working grid, either set of fringes can be independently displayed in black and white while obscuring the other set. In this instance, because only the filter is moved, the critical alignment of the master and working grids is undisturbed such that undesirable translational and rotational mismatch between the grids is avoided. Also, movement of the polarizing filter relative to the master and working grids is effective to alter the relative positioning of the image of one grid onto the other grid. This may be of benefit in initially obtaining an arbitrary zero position from which measurements can be taken.

A primary object of the invention is the provision of a new and improved method and apparatus for analyzing deformation in a test specimen.

Another object of the invention is the provision of a new and improved method and apparatus for optically analyzing deformation in a test specimen.

Still another object of the invention is the provision of a new and improved method and apparatus for deformation analysis which employs moiré patterns in which fringes appear as distinguishable and apparently dissimilar colors. A related object of the invention is the provision of such apparatus which includes a pair of spaced indicia arrays, one of which is deformable relative to the other, an optical mechanism for superposing an image of one of the arrays onto the other of the arrays, and a barrier for obscuring part of the image such that remaining parts of the image superposed on the other of the arrays result in a pattern of fringes which appears as discrete colors.

Yet another object of the invention is to provide a new and improved method and apparatus for deformation analysis which includes a polarizing filter positioned between a master grid and a working grid and effective to obstruct part of the image of one grid on the other grid such that both sets of fringes appear simultaneously as distinguishable and apparently dissimilar colors.

Other and further objects and advantages of the invention are obvious or will be presented in the description which follows, taken together with the accompanying drawings.

Figure 1:
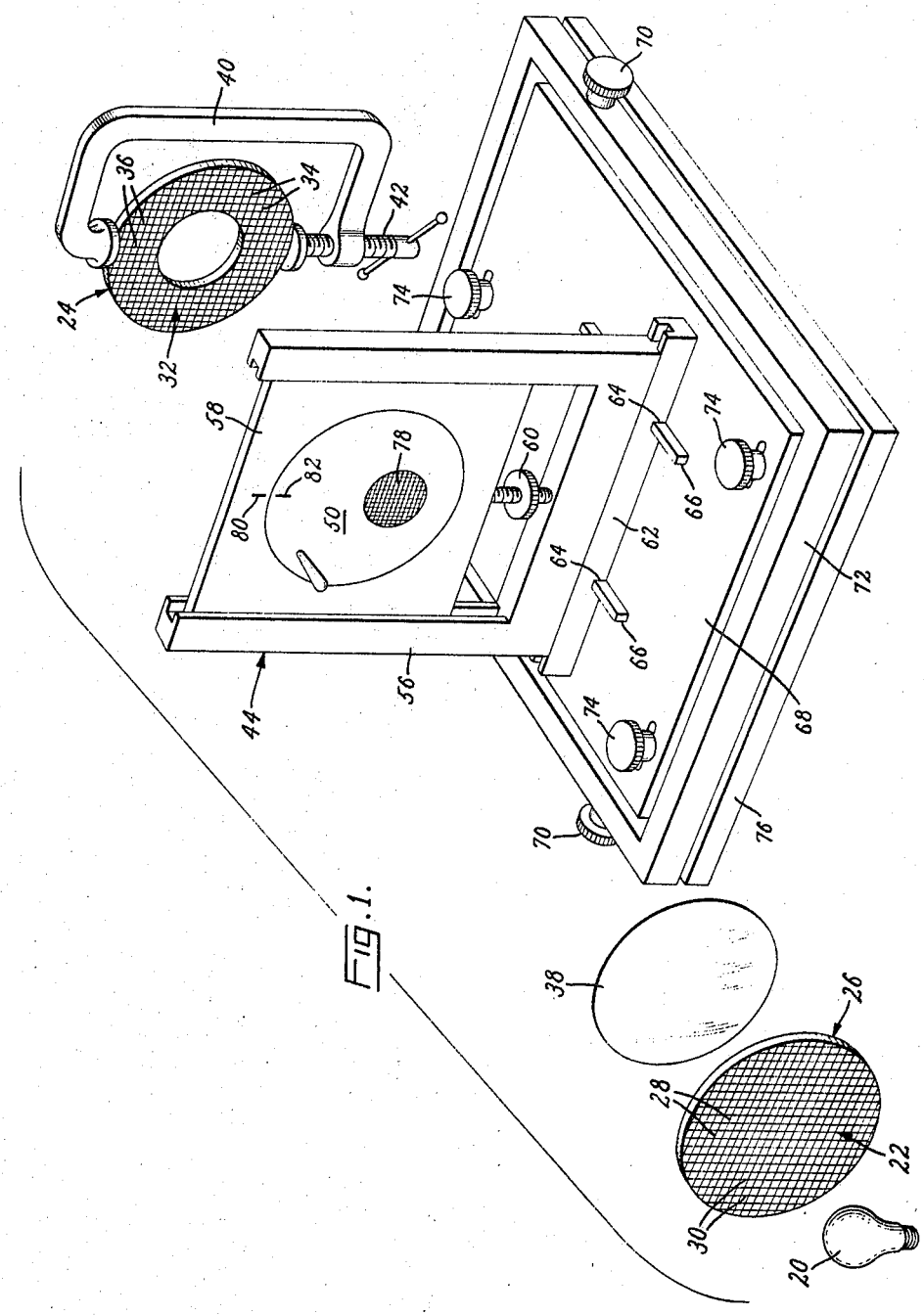
FIGURE 1 is a perspective view schematically representing a test arrangement which embodies the present invention.

Refer now to the drawings and initially to FIGURE 1 in which a white light source 20 is provided for illuminating a master grid 22 and for superposing an image of the master grid 22 onto a test specimen 24. The master grid 22 is preferably an array of orthogonal opaque lines suitably provided on a translucent plate 26. The orthogonal lines of the master grid 22 are preferably composed of a set of uniformly spaced horizontal or Y-axis lines 28 and a set of uniformly spaced vertical or X-axis lines 30. Similarly, a working grid 32 is suitably provided on a plane of the test specimen 24 and includes a set of uniformly spaced horizontal or Y-axis lines 34 and a set of uniformly spaced vertical or X-axis lines 36.

The working grid 32 is substantially congruent with the master grid 22 when the test specimen 24 is in a relaxed or undeformed condition. In order to superpose an image of the master grid 22 onto the working grid 32 of the specimen 24, a suitable lens 38 is provided intermediate the plate 26 and the specimen 24 and renders a substantially 1:1 ratio of size of the master grid 22 to that of the working grid 32. In this manner, an image of the Y-axis lines 28 substantially coincides with the Y-axis lines 34 and an image of the X-axis lines 30 substantially coincides with the X-axis lines 36.

Figure 2:
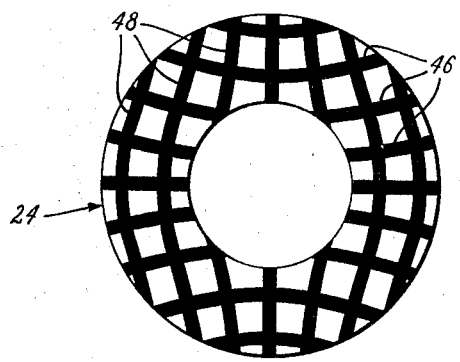
FIGURE 2 is a front elevation view of a test specimen under strain, as illustrated in FIGURE 1, and indicating a display of conventional moiré fringes which occur in the absence of a polarizing filter.

When employing a test arrangement as shown in FIGURE 1 but absent a barrier assembly 44, fringes of the type indicated in FIGURE 2 are displayed on a plane of the specimen 24 when a suitable clamping device 40 supporting the test specimen 24 imparts a strain to the specimen in response to rotation of a threaded handle 42. Specifically, a set of generally horizontal Y-fringes 46 appear because the Y-axis lines 34 are displaced relative to the Y-axis lines 28 and a set of generally vertical X-fringes 48 appear because the X-axis lines 36 are displaced relative to the X-axis lines 30. This results from the fact that the strain imparted to the test specimen 24 by the clamping device 40 causes a deformation of the test specimen and accordingly of the working grid 32 on a plane of the specimen. The simultaneous display of the Y-fringes 46 and of the X-fringes 48 illustrated in FIGURE 2 is of a conventional nature in which the pitch or spacing between adjacent fringes is relatively coarse. However, in practice, it is often necessary to employ master and working grids having a relatively fine pitch in order to obtain more accurate strain information, although it will be apparent that the finer the master and working grids, the greater the difficulty of distinguishing the Y-fringes 46 from the X-fringes 48.

To utilize the accuracy obtainable with a fine master grid 22 and a correspondingly fine working grid 32 while avoiding the difficulty of distinguishing bewteen Y-fringes 46 and X-fringes 48, it has been found beneficial to display the Y-fringes 46 and the X-fringes 48, respectively, in dissimilar colors. This can be accomplished by locating the barrier assembly 44 (FIGURE 1) including a suitable polarizing filter 50, intermediate the master grid 22 and the working grid 32. When the polarizing filter 50 is properly positioned and aligned, a display of generally horizontal Y-fringes 52 (FIGURE 3) and generally vertical X-fringes 54 is provided on a plane of the test specimen 24 respectively in distinguishable and dissimilar colors. One set of fringes, for example, the Y-fringes 52, appear to be predominantly blue in color and the other set of fringes, for example, the X-fringes 54, appear to be predominantly red in color.

The barrier assembly 44 (FIGURE 1) includes a U-shaped support member 56 which slidingly receives a support plate 58 on which, in turn, the polarizing filter 50 is mounted for co-planar rotation. A suitable mechanism such is a screw jack 60 can be operated to obtain vertical displacement of the plate 58 and of the filter 50 relative to the support member 56. Additionally, the polarizing filter 50 is laterally and longitudinally movable relative to an imaginary line connecting the plate 26 and the specimen 24 and can also be rotated about a vertical axis or tilted about a plurality of axes. Lateral movement of the filter 50 is achieved by slidingly mounting the support member 56 on a suitable track element 62. To obtain longitudinal movement of the filter, the track element 62 includes spaced slots 64 slidingly engageable with spaced tracks 66 integral with an upper base 68. A pair of suitable screw jacks 70 are rotatably mounted adjacent opposite corners of a lower base 72 and are threadedly engaged with respective portions of the upper base 68 such that upon rotation of the screw jacks 70, the polarizing filter 50 is rotated about a vertical axis. In order to tilt the filter 50, screw jacks 74, preferably three in number and rotatably mounted on the lower base 72, respectively, adjacent two successive corners and adjacent an edge opposite the corners and midway between adjacent edges, are threadedly engaged with respective portions of a stationary platform 76 such that upon rotation of the screw jacks 74, the polarizing filter 50 can be tilted about a plurality of axes.

Figure 3:
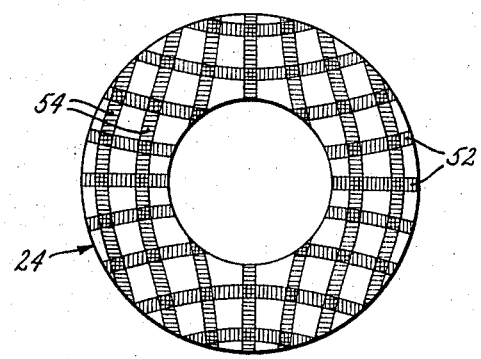
FIGURE 3 is a front elevation view similar to FIGURE 2 and illustrating the presence of X- and Y-fringes which appear, respectively, in dissimilar colors when a polarizing filter shown in FIGURE 1 is moved to a selected position.
Figure 4:
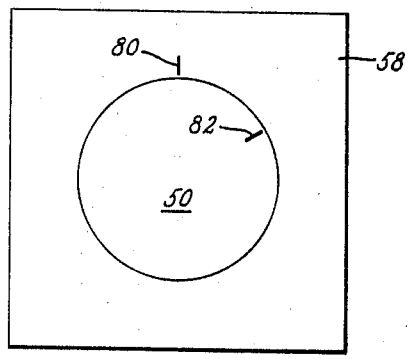
FIGURE 4 is a detail elevation view of a polarizing filter as shown in FIGURE 1 and indicating a typical position for obtaining the result illustrated in FIGURE 3.
Figure 5:
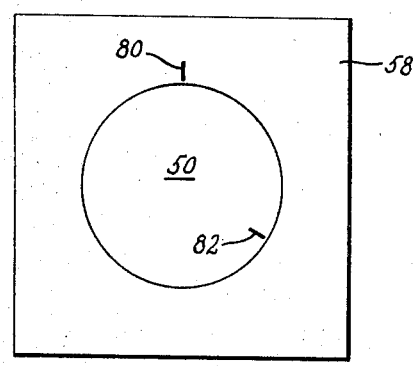
FIGURE 5 is a view similar to FIGURE 4 and indicating another typical position of the polarizing filter.
Figure 6:
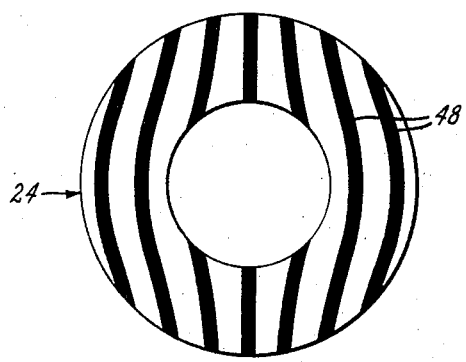
FIGURE 6 is a view similar to FIGURES 2 and 3 and illustrating a display of fringes which appears when the filter is moved to the position indicated in FIGURE 5.
Figure 7:
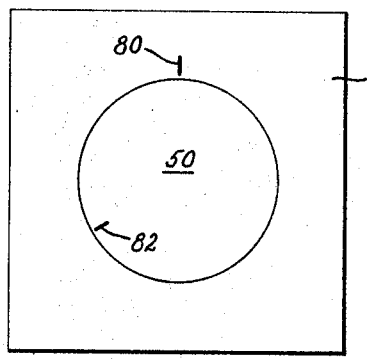
FIGURE 7 is a view similar to FIGURES 4 and 5 and indicating still another typical position of the polarizing filter.

The display illustrated in FIGURE 3 is achieved when the filter 50 has been moved by any of the mechanisms described to a certain selected position. In this certain selected position which is to be taken as being only an example, the filter 50 assumes a position in which it center of rotation is displaced in a vertical direction above an imaginary line joining the center of the plate 26 and the center of the specimen 24 by approximately a radius of an image 78 of the master grid 22 on the filter 50. Continuing with the example, the filter 50 lies in a plane which is substantially parallel with the master grid 26 and the working grid 32. An arbitrary mark 80 is provided on the support plate 58 and a similar mark 82 is provided on the filter 50 and upon rotation of the filter 50 to a position indicated in FIGURE 4 results in the display shown in FIGURE 3. Further rotation of the filter 50 until the mark 82 assumes a position as indicated in FIGURE 5 results in a display such as that seen in FIGURE 6. Continued rotation of the filter 50 until the mark 82 assumes a position as indicated in FIGURE 7 results in a display such as that seen in FIGURE 8. In FIGURE 6 the X-fringes 48 are substantially black and similarly in FIGURE 8, the Y-fringes 46 are substantially black.

Figure 8:
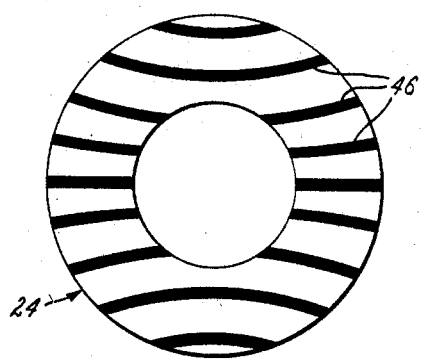
FIGURE 8 is a view similar to FIGURES 2, 3, and 6 and illustrating a display of fringes which appears when the filter is moved to the position indicated in FIGURE 7.

In the past, when it was desirable to view-X-fringes alone or Y-fringes alone because of the difficulty of distinguishing X-fringes from Y-fringes when using a fine master grid and a fine working grid, it was customary to use a master grid having only one set of spaced parallel lines. Then, in order to view the X- and Y-fringes individually, the master grid was rotated from a position in which its lines were parallel to the one set of lines on the working grid, through 90 degrees of arc to a position in which its lines were parallel to the other set of lines on the working grid. However, undesirable fringe aberrations would result if, upon rotation, the master grid was improperly positioned such that there were slight angular variations between the lines of the master grid and those of the working grid. In contrast, rotation of the filter 50 from the position of FIGURE 5 to that of FIGURE 7 in order to obtain first the display of FIGURE 6 and then the display of FIGURE 8, is not nearly as critical while yet permitting similar results. It has also been determined that various movements of the polarizing filter 50 provided for by the barrier assembly 44 are effective to alter the positioning of an image of the master grid 22 on the working grid 32 whereby it is possible to obtain an arbitrary "zero" position from which measurements between fringes can be obtained.

Figure 9:
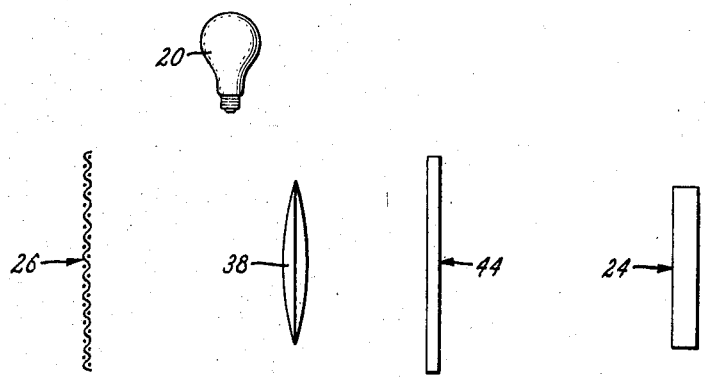
FIGURE 9 is a side elevation view schematically representing a modified test arrangement embodying the invention.

Another embodiment of the test arrangement illustrated in FIGURE 1 is indicated in FIGURE 9 in which all of the components described above are present in which the light source 20 has been moved from a position co-linear with the master grid 22 and with the working grid 32 to a laterally disposed position. With this modified arrangement, an image of the working grid 32 appears on a plan of the plate 26 but the results achieved remain substantially as described. In this instance, it is to be understood that the plate 26 may be opaque since light from the source 20 is not required to pass through the plate as in the arrangement of FIGURE 1.

Figure 10:
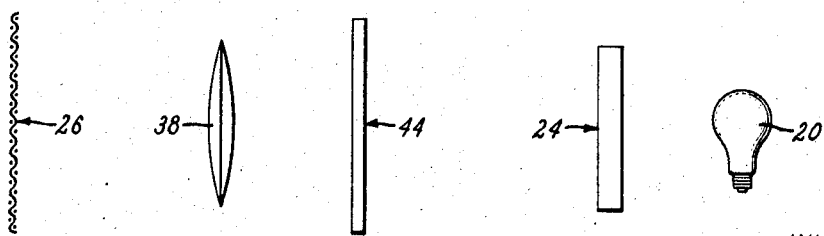
FIGURE 10 is a side elevation view schematically representing another modified test arrangement.

Still another embodiment of the test arrangement is presented in FIGURE 10. In this instance, the light source 20 is co-linear with the master grid 22 with the working grid 32 but is located behind the test specimen 24. With this modified arrangement, the test specimen 24 must be translucent in order to permit illumination of the master grid 22 and of the working grid 32 and an image of the working grid 32 appears on a plane of the plate 26. As with the embodiment of FIGURE 9, the embodiment of FIGURE 10 does not require the plate 26 to be translucent and affords results substantially unchanged from those obtained with the embodiment of FIGURE 1.

Although many modifications and variations of the present invention are possible within the spirit of instant disclosure, it is intended that the embodiments disclosed be deemed illustrative and not restrictive, reference being had to the following claims rather than to the specific description to indicate the scope of the invention.

What is claimed is:

1. Apparatus for analyzing deformation in a test specimen comprising:
   a pair of spaced indicia means, one of said indicia means being deformable,
   operative means for superposing an image of one of said indicia means onto the other of said indicia means, and
   barrier means for obscuring part of the image whereby remaining parts of the image superposed on said other of said indicia means result in a display of fringes which appears in distinguishable colors.

2. Apparatus as set forth in claim 1 wherein said pair of indicia means includes master indicia means spaced from the specimen and working indicia means on a plane of the specimen, said working indicia means being substantially congruent with said master indicia means when the specimen is in a relaxed condition and being deformed relative to said master indicia means when the specimen is in a deformed condition.

3. Apparatus as set forth in claim 2 wherein said master indicia means includes at ranslucent plate and a first array of orthogonal lines on a plane of said plate, said working indicia means includes a second array of orthogonal lines on a plane of the specimen and substantially congruent with said first array when the specimen is in a relaxed condition, and said barrier means includes a polarizing filter positioned between said first array and said second array, said filter being rotatable to a position wherein part of the image is obscured and part of the image is superposed on said second array and results in a display of fringes which appears in distinguishable colors.

4. Apparatus as set forth in claim 3 wherein said barrier means includes a platform and means mounting said polarizing filter on said platform for angular and translateral movement relative to said plate and to said specimen.

5. Apparatus as set forth in claim 2 wherein said master indicia means includes a member and a first array of symbols on a plane of said member and said working indicia means includes a second array of symbols on a plane of the specimen and substantially congruent with said first array when the specimen is in a relaxed condition, said operative means superposing an image of said first array onto said second array and said barrier means obscuring part of the image whereby remaining parts of the image superposed on said second array result in a display of fringes which appears in distinguishable colors.

6. Apparatus as set forth in claim 5 wherein said member is translucent.

7. Apparatus as set forth in claim 2 wherein said master indicia means includes a member and a first array of symbols on a plane of said member and said working indicia means includes a second array of symbols on a plane to the specimen and substantially congruent with said first array when the specimen is in a relaxed condition, said operative means superposing an image of said second array onto said first array and said barrier means obscuring part of the image whereby remaining parts of the image superposed on said first array result in a display of fringes which appears in distinguishable colors.

8. Apparatus as set forth in claim 7 wherein said member is translucent.

9. Apparatus as set forth in claim 7 wherein said specimen is translucent.

10. Apparatus as set forth in claim 1 wherein said operative means includes a source of white light and a lens for projecting light from said source onto one of said indicia means.

11. Apparatus as set forth in claim 1 wherein said barrier means includes a polarizing filter positioned between said pair of indicia means, said filter being movable to a position wherein part of the image is obscured and part of the image is superposed on said other of said indicia means and results in a display of fringes which appears in distinguishable colors.

12. A method for analyzing deformation in a test specimen comprising the steps of:
   providing a pair of spaced normally congruent indicia means,
   superposing an image of one of the indicia means onto the other of the indicia means,
   deforming one of the indicia means,
   providing a polarizing filter between the pair of indicia means to obscure part of the image whereby remaining parts of the image superposed on the other of the indicia means result in a display of fringes, and
   adjusting the filter to different positions resulting at one position in a display of fringes which appears as distinguishable colors and at another position in a display of only black fringes.

13. A method for analyzing deformation in a test specimen comprising the steps of:

providing a pair of spaced normally congruent indicia means,
superposing an image of one of the indicia means onto the other of the indicia means,
deforming one of the indicia means,
providing a polarizing filter between the pair of indicia means to obscure part of the image whereby remaining parts of the image superposed on the other of the indicia means result in a display of fringes, and
adjusting the filter to alter the positioning of the image of one of the indicia means on the other of the indicia means.

References Cited

UNITED STATES PATENTS

| 2,646,716 | 7/1953 | Bowen | 356—33 |
| 2,992,589 | 7/1961 | Williams | 356—33 |
| 3,096,175 | 7/1963 | Zandman | 356—34 |
| 3,229,567 | 1/1966 | Zandman | 356—34 |

RICHARD C. QUEISSER, Primary Examiner

JERRY W. MYRACLE, Assistant Examiner

U.S. Cl. X.R.

356—33